Patented May 11, 1926.

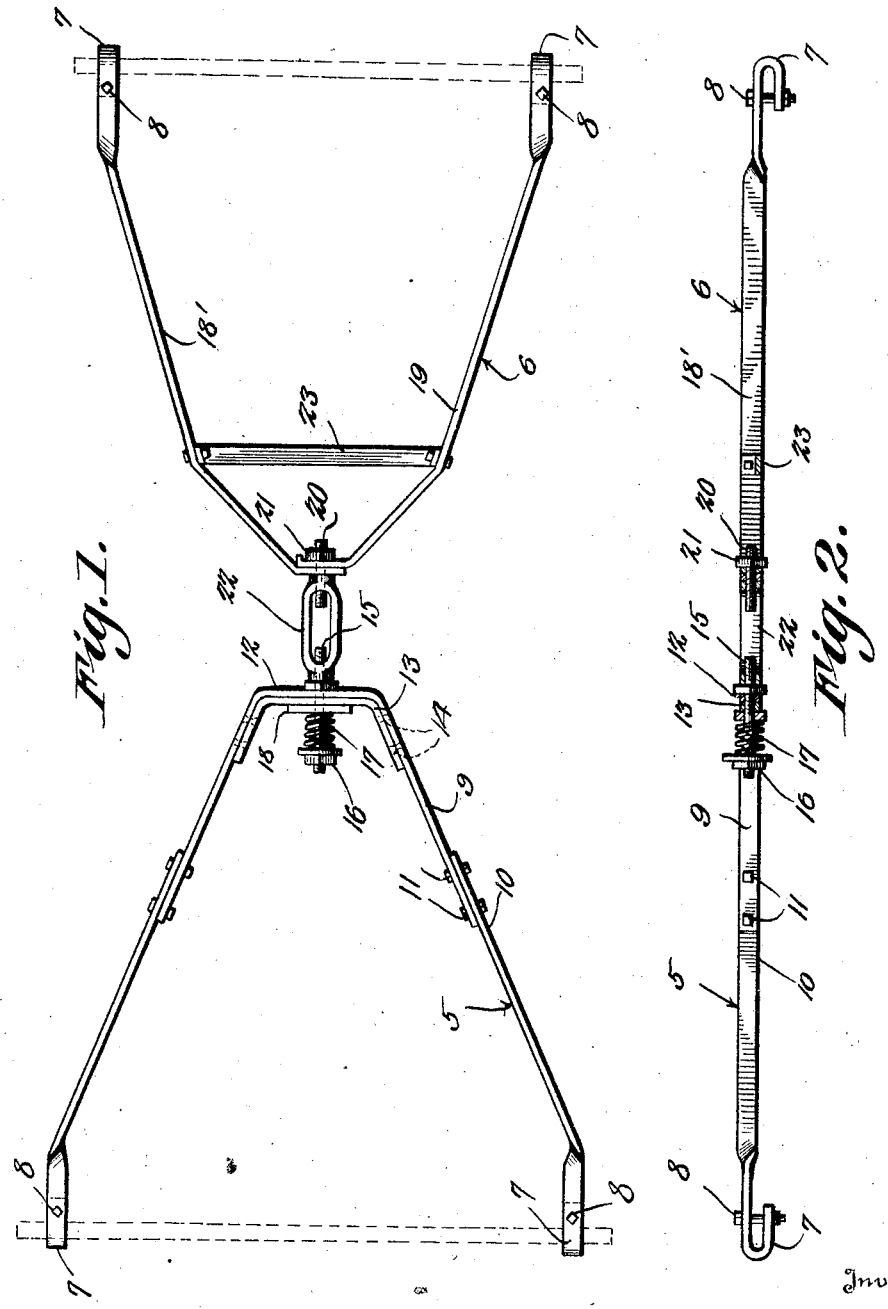

1,584,389

UNITED STATES PATENT OFFICE.

GEORGE LUKENS, OF EAST ST. LOUIS, ILLINOIS.

SHOCK ABSORBER.

Application filed June 19, 1925. Serial No. 38,350.

This invention relates to a device especially designed for use in connecting the front and rear springs of a motor vehicle to hold the front and rear springs in proper spaced relation with each other, and to reduce movement of the springs in horizontal planes with respect to each other.

A further object of the invention is to improve the construction as illustrated in my pending application bearing Serial Number 744,710, by compensating for movement between the sections of the device when the vehicle is passing over exceptionally rough ground surfaces.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of a device constructed in accordance with the invention.

Figure 2 is a longitudinal sectional view therethrough.

Referring to the drawing in detail, the device includes sections 5 and 6 respectively, each of which includes side bars having their outer ends formed into hook portions 7 which may be positioned over the springs of a motor vehicle and secured in position by means of bolts 8 that pass through the hook portions.

The side members of the section 5 include arms 9 and 10 respectively, which are bolted together at 11.

The arms 9 are formed integral with the bar 12 which is reinforced by means of the bar 13 riveted to the bar 12 at 14.

Suitable openings are formed in the bars 12 and 13 which openings accommodate the bolt 15 that is supplied with a nut 16 at one end, which nut provides an abutment for one end of the coiled spring 17 which has its opposite end contacting with the plate 18 that engages the bar 13.

The opposed section of the shock absorber is made up of a pair of arms 18' and 19 that are connected at the inner ends by means of the bolt 20 that operates through suitable openings formed in the arms 18', the nut 21 being provided on the bolt to secure the arms in position.

The reference character 22 indicates a turn buckle that moves on the inner threaded ends of the bolts 15 and 20 to the end that the sections 5 and 6 may be adjusted with respect to each other, the action of the coiled spring 17 being to normally hold the sections 5 and 6 against movement, but under unusual strains, give and allow the sections 5 and 6 to move.

A bar indicated at 23 holds the arms 18 and 19 in proper spaced relation with each other at all times.

From the foregoing it will be obvious that when a device of this character is positioned between the front and rear springs of a motor vehicle, the tension of the spring 17 will be sufficient to hold the springs against vibrations in horizontal planes, but will under undue strain give and allow a slight movement of the section 5 with respect to the section 6.

I claim:—

1. In a device of the character described, a front section and a rear section, means for adjustably connecting the front and rear sections, and means for clamping the sections to the springs of a motor vehicle.

2. In a device of the character described, a front section and a rear section, bolts extending through the adjacent ends of the sections, a turn buckle operating over the bolts to adjust the sections with respect to each other, and resilient means for permitting movement of one section with respect to the adjacent section.

3. In a device of the character described, a pair of sections, said sections having spring clamping members at their outer ends, adjustable means for connecting the sections, and a resilient member positioned at the inner end of one of the sections to permit movement of one section with respect to the adjacent section.

4. In a device of the character described, a pair of sections, spring engaging members at the outer ends of the sections, bolts extending through the sections, a coiled spring mounted on one of the bolts, to restrict movement thereof, and a turnbuckle mounted on the bolts for moving the sections towards and away from each other.

5. In a device of the character described, a pair of sections, bolts carried by the sections, means connected with the bolts for adjusting the bolts towards and away from each other, and resilient means on one of the bolts for restricting movement thereof.

In testimony that I claim the foregoing as my own, I have hereto affixed my signature.

GEORGE LUKENS.